United States Patent [19]

Matsuda et al.

[11] Patent Number: 4,512,912
[45] Date of Patent: Apr. 23, 1985

[54] WHITE LUMINESCENT PHOSPHOR FOR USE IN CATHODE RAY TUBE

[75] Inventors: Naotoshi Matsuda, Kawasaki; Yoshinori Tetsuishi; Kazuaki Higuchi, both of Fukaya, all of Japan

[73] Assignee: Kabushiki Kaisha Toshiba, Kawasaki, Japan

[21] Appl. No.: 637,724

[22] Filed: Aug. 6, 1984

[30] Foreign Application Priority Data

Aug. 11, 1983 [JP] Japan ............... 58/145729

[51] Int. Cl.³ ............................................. C09K 11/477
[52] U.S. Cl. ..................... 252/301.6 S; 252/301.4 R; 313/468
[58] Field of Search .................. 252/301.4 R, 301.6 S, 252/646; 313/467, 468, 487

[56] References Cited

U.S. PATENT DOCUMENTS 3,394,084  7/1968  Avella ............................ 252/301.4
3,922,233  11/1975  Torii et al. ............... 252/301.4 R X

FOREIGN PATENT DOCUMENTS 47-31888  11/1972  Japan .
53-15280  2/1978  Japan ............................ 252/301.6 S
57-51783  3/1982  Japan ............................ 252/301.4 R
57-128778  8/1982  Japan ............................ 252/301.4 R
907058  2/1982  U.S.S.R. ...................... 252/301.6 S

OTHER PUBLICATIONS

National Technical Report, 25, 251, (1979).

*Primary Examiner*—Jack Cooper
*Attorney, Agent, or Firm*—Schwartz, Jeffery, Schwaab, Mack, Blumenthal & Koch

[57] ABSTRACT

Disclosed is a white luminescent phosphor for use in a cathode ray tube, which comprises a mixture of at least one phosphor having a composition of the following formula:

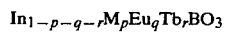

$$In_{1-p-q-r}M_pEu_qTb_rBO_3$$

wherein M represents at least one element selected from the group consisting of Sc, Lu, Y, La, Gd and Ga; and each of p, q and r represents a number satisfying the relationships of $p \geq 0$, $q \geq 0$, $r \geq 0$ and $0 < p+q+r < 1$, and having a 10% afterglow period of 10 milliseconds or longer, and a blue luminescent phosphor having the composition of ZnS:Ag.

13 Claims, 1 Drawing Figure

WHITE LUMINESCENT PHOSPHOR FOR USE IN CATHODE RAY TUBE

BACKGROUND OF THE INVENTION

This invention relates to an improved white luminescent mixed phosphor for use in a cathode ray tube.

For preparation of a white luminescent fluorescent screen of a cathode ray tube for terminal display such as a display tube, because of the absence of a practically available single white luminescent fluorescent phosphor, it has been practiced in the art to employ a mixture of several phosphors with different luminescent colors at appropriate proportions.

Examples of such white luminescent mixed phosphors known in the art may include a mixture of a blue-emitting silver-activated zinc sulfide phosphor (Zns:Ag) and a copper-activated zinc-cadmium sulfide phosphor {(Zn,Cd)S:Cu} emitting light with a complementary color thereof mixed at a suitable proportion so as to emit substantially white color by electron beam excitation (disclosed in U.S. Pat. No. 3,891,886), or a mixture of the three kinds of phosphors of the above blue-emitting ZnS:Ag, a green-emitting manganese-arsenic-activated zinc silicate phosphor ($Zn_2SiO_4$:Mn,As) and a red-emitting manganese-activated zinc phosphate phosphor {$Zn_3(PO_4)_2$:Mn} or manganese activated zinc-magnesium phosphate phosphor {$(Zn,Mg)_3(PO_4)_2$:Mn} mixed at a suitable proportion so as to emit substantially white color by electron beam excitation (disclosed in National Technical Report 25, 251 1978).

However, in the case of the former mixed phosphor, since its 10% afterglow period is less than 10 milliseconds (ms), the cathode-ray tube having its fluorescent screen constituted of this mixed phosphor cannot be free from the drawback of greater flicker on its picture screen.

In the case of the latter mixed phosphor, while the flicker on the fluorescent screen can be alleviated due to the longer afterglow period of each of $Zn_2SiO_4$:Mn,As and $Zn_3(PO_4)_2$:Mn or $(Zn,Mg)_3(PO_4)_2$:Mn on one hand, there is involved the drawback that no sufficient luminance can be obtained, on the other hand.

For solving such a problem, the present inventors have proposed a mixed phosphor employing, in place of the red-emitting component in the latter mixed phosphor, an orange-emitting phosphor, for example, a manganese activated cadmium chlorophosphate {$Cd_5Cl(PO_4)_3$:Mn} phosphor. This mixed phosphor has sufficient luminance and is also excellent in flicker alleviating effect.

However, in this mixed phosphor, since a harmful element of cadmium is contained in $Cd_5Cl(PO_4)_3$:Mn as shown above as an exemplary orange-emitting phosphor, it cannot be stated to be preferable from the viewpoint of preventing pollution. Also, in the case of this mixed phosphor, the matrices for the respective component phosphors to be mixed are entirely different materials, and therefore it is difficult to obtain a homogeneous mixture by mixing these componente. Accordingly, a fluorescent screen constituted of this mixed phosphor had the drawback that irregularity is liable to be formed in the color emitted.

On the other hand, there is known a phosphor principally comprised of $InBaO_3$ and activated with any one of Tb, Eu, Dy and Sm (disclosed in U.S. Pat. No. 3,394,084). However, what is intended in this prior art by the incorporation of these rare earth elements is merely to obtain phosphors of different cathodoluminescence color by incorporation of any one of Tb, Eu, Dy and Sm; for instance, green cathodoluminescence by Tb-activated $InBaO_3$, or red cathodoluminescence by Eu-activated $InBaO_3$.

SUMMARY OF THE INVENTION

An object of this invention is to provide a white luminescent mixed phosphor for use in a cathode ray tube, having sufficient luminance under electron beam excitation and the effect of alleviating flicker, containing no harmful element of cadmium and also capable of constituting a fluorescent screen with little color irregularity.

The present inventors have found the facts that, in the CIE chromaticity diagram shown in the drawing, the europium activated indium borate ($InBO_3$:Eu) emits light with high efficiency to the reddish orange indicated by the point G (x=0.604, y=0.396 in the CIE chromaticity coordinate), while the terbium activated indium borate ($InBO_3$:Tb) emits light with high efficiency to the green indicated by the point F (x=0.325, y=0.628 in the CIE chromaticity coordinate), and both having a 10% afterglow period of 10 ms or longer; and further that the indium borate activated with both of Eu and Tb emits light with high efficiency having a chromaticity on the straight line connecting between the above points G and F by suitable selection of its activation amount, its 10% afterglow period being also 10 ms or longer. As a consequence, the present inventors have thought of an idea that a mixed phosphor emitting yellow light complementary to blue color can be obtained by mixing these phosphors at a suitable proportion, and have further made studies to successfully develop the white luminescent mixed phosphor of this invention.

More specifically, the white luminescent phosphor of this invention comprises a mixture of at least one phosphor having a composition of the following formula:

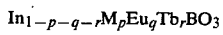

$$In_{1-p-q-r}M_pEu_qTb_rBO_3$$

wherein M represents at least one element selected from the group consisting of Sc, Lu, Y, La, Gd and Ga; and each of p, q and r represents a number satisfying the relationships of $p \geq 0$, $q \geq 0$, $r \geq 0$ and $0 < p+q+r < 1$, and also having a 10% afterglow period of 10 milliseconds or longer, and a blue luminescent phosphor having the composition of ZnS:Ag.

DESCRIPTION OF THE PREFERRED EMBODIMENTS

Figure 1:
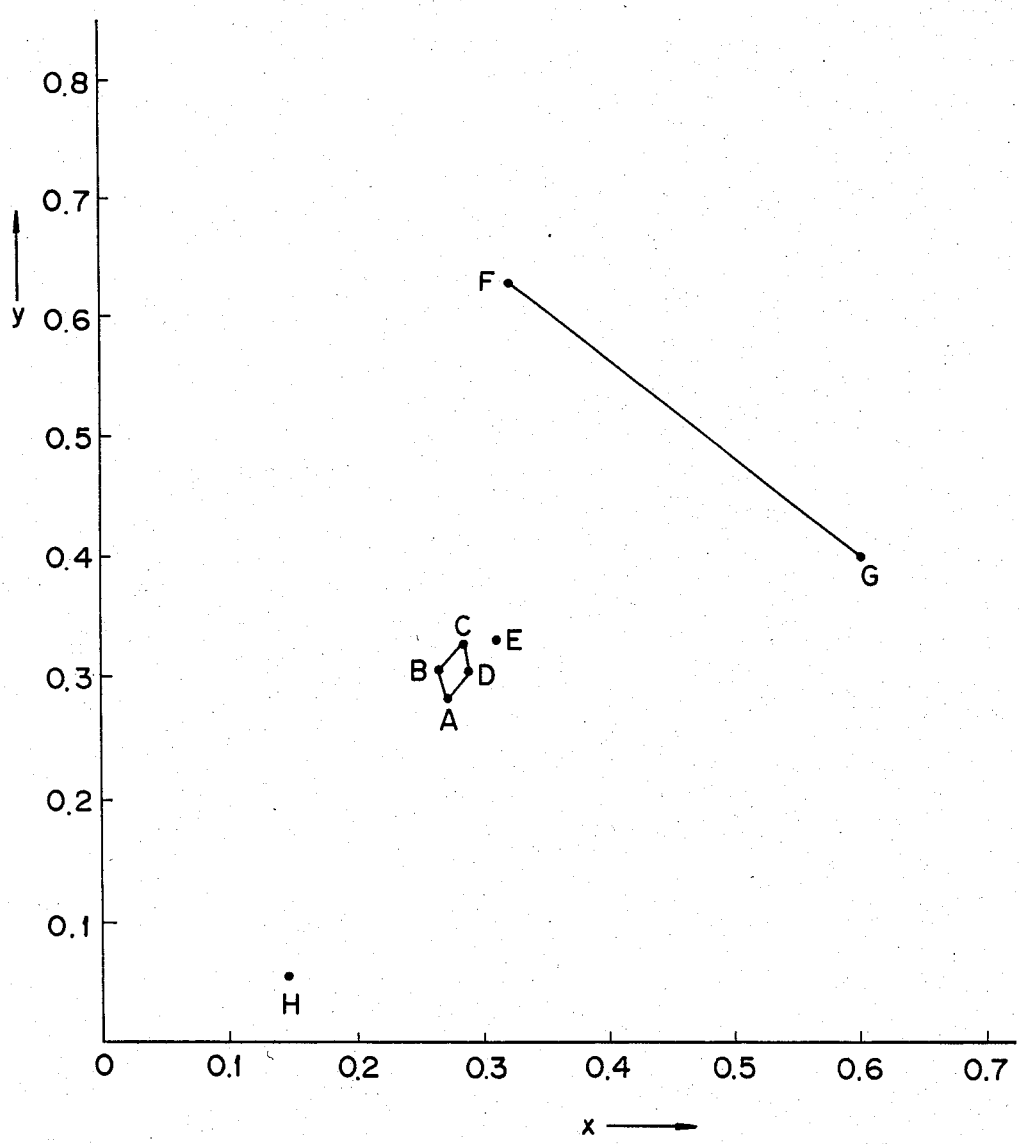
FIG. 1 is a chromaticity diagram showing the scope of the JEDEC standard represented by the parallelogram ABCD, the white color of 6500 K.+7MPCD represented by the point E, the luminescent color of $InBO_3$:Tb represented by the point F, the luminescent color of $InBO_3$:Eu represented by the point G and the luminescent color of ZnS:Ag represented by the point H.

The "white" as herein mentioned refers to the emitted color having the chromaticity within the standard of JEDEC (Joint Electron Device Engineering Councils) surrounded by the four points of the point A (x=0.273, y=0.282), the point B (x=0.267, y=0.303), the point C (x=0.286, y=0.326) and the point D (x=0.290, y=0.303), the vicinity thereof, the point indicated by the color temperature of 6500 K.+7MPCD and the vicinity thereof.

In this invention, the phosphor shown by the compositional formla of $In_{1-p-q-r}M_pEu_qTb_rBO_3$ is an orange- to yellow-emitting phosphor.

This is a phosphor comprising $InBO_3$ having a calcite crystalline structure as the matrix, and p, q, r are indices indicating mols of the respective elements. Each of p, q and r is a decimal of 0 or greater, but these cannot be zero at the same time. These p, q and r are selected appropriately depending on such factors as the chromaticity of the desired emitted color of the phosphor, the emission efficiency, the influence on the crystalline structure of the matrix, etc. and therefore they cannot be determined unequivocally. Generally, p is 0.2 or less, q is 0.04 or less and r is 0.04 or less.

Accordingly, this phosphor is at least one of or a mixture of two or more of a $InBO_3$:Eu,Tb alone wherein p=0 and q, r are appropriate numbers; a mixture of $InBO_3$:Eu wherein p=r=0 and q is an appropriate number, $InBO_3$:Tb wherein p=q=0 and r is an appropriate number and $InBO_3$:Eu,Tb wherein p=0 and q, r are appropriate numbers mixed in a suitable combination; and each of the above cases, wherein a part of In is substituted in p mols (p=0) with at least one element selected from the group consisting of ScLu, Y, Gd and Ga. And, these phosphors in any case are required to have a 10% afterglow period of 10 ms or longer. If it is less than 10 ms, no flicker alleviating effect can be exhibited.

These phosphors can be prepared readily according to a conventional procedure by mixing the powders of the element sources such as oxides of the respective elements in appropriate amounts to a desired composition, calcining at a certain temperature the powder mixture obtained in a vessel in which no impurity is entrained, and then subjecting the calcinined product to cooling, washing with water, filtration, drying and screening.

The other component in the white luminescent mixed phosphor of this invention is a blue luminescent phosphor having a 10% afterglow period of 10 $\mu s$ or longer. With a 10% afterglow period shorter than 10 $\mu s$, the flicker alleviating effect is undesirably lowered. As an example of such a blue luminescent phosphor, there may be employed the above-mentioned ZnS:Ag.

The mixed phosphor of this invention can be prepared easily by mixing the respective phosphors at desired proportions. The proportions employed cannot be determined unequivocally, since they are different depending on the chromaticity of the respective phosphors employed in the CIE chromaticity diagram and their emission efficiencies. Generally speaking, the blue-emitting phosphor may be used in an amount within the range of from 10 to 40%, preferably 10 to 30%, in terms of weight ratio.

The thus prepared white luminescent mixed phosphor can be used for a cathode ray tube by applying it on the display screen of a cathode-ray tube by a conventional coating method to provide a luminescent layer thereon.

EXAMPLES 1 TO 10

The respective phosphors of the compositional formulae as shown in Table 1 were mixed at proportions indicated in the Table. Also, cathode-ray tubes having the fluorescent screens constituted of the respective mixed phosphors were prepared and the color irregularities under conventional electron beam excitation were observed with naked eyes. Color uniformity (herein meant to be chromaticity difference between central area and peripheral area of the fluorescent screen; $\sqrt{(\Delta x)^2 + (\Delta y)^2}$ was also measured. Results of these are summarized in Tables 1a.

The luminance is represented in terms of the relative luminance to the luminance of a commercially available $Zn_2SiO_4$:Mn,As phosphor (JEDEC registered P39 phosphor) as 100%, and the critical fusion frequency (herein meant to be the number per second of displayed images in which flickers start to appear) is a measured value at the luster luminance of 20 ft-L.

In the Tables, Table 1 shows the composition and the CIE chromaticity coordinate of phosphors of Examples 1 to 10 and Comparative Examples 1 to 5; and Table 1a, the luminance, the critical fusion frequency, the harmfulness, the color irregularity and the color uniformity of the corresponding Examples and Comparative examples.

TABLE 1

*(P22 blue component)

| | Compositional formula of phosphor and proportions thereof (wt. %) | | CIE chromaticity coordinate |
|---|---|---|---|
| Example 1: | ZnS:Ag* | 25 | x = 0.276 |
| | $In_{0.995}Tb_{0.005}BO_3$ | 47.5 | y = 0.302 |
| | $In_{0.97}Eu_{0.03}BO_3$ | 27.5 | |
| Example 2: | ZnS:Ag* | 20 | x = 0.276 |
| | $In_{0.995}Tb_{0.005}BO_3$ | 42 | y = 0.302 |
| | $In_{0.996}Eu_{0.003}Tb_{0.001}BO_3$ | 38 | |
| Example 3: | ZnS:Ag* | 25 | x = 0.276 |
| | $In_{0.995}Tb_{0.005}BO_3$ | 47.5 | y = 0.302 |
| | $In_{0.76}Y_{0.2}Eu_{0.04}BO_3$ | 27.5 | |
| Example 4: | ZnS:Ag* | 25 | x = 0.276 |
| | $In_{0.995}Tb_{0.005}BO_3$ | 47.5 | y = 0.302 |
| | $In_{0.86}Sc_{0.1}Eu_{0.04}BO_3$ | 27.5 | |
| Example 5: | ZnS:Ag* | 26 | x = 0.276 |
| | $In_{0.995}Tb_{0.005}BO_3$ | 43 | y = 0.302 |
| | $In_{0.92}Lu_{0.05}Eu_{0.03}BO_3$ | 31 | |
| Example 6: | ZnS:Ag* | 25 | x = 0.276 |
| | $In_{0.945}La_{0.05}Tb_{0.005}BO_3$ | 49 | y = 0.302 |
| | $In_{0.97}Eu_{0.03}BO_3$ | 26 | |
| Example 7: | ZnS:Ag* | 26 | x = 0.276 |
| | $In_{0.995}Tb_{0.005}BO_3$ | 45 | y = 0.302 |
| | $In_{0.96}Gd_{0.01}Eu_{0.03}BO_3$ | 29 | |
| Example 8: | ZnS:Ag* | 27 | x = 0.276 |
| | $In_{0.985}Ga_{0.01}Tb_{0.005}BO_3$ | 44 | y = 0.302 |
| | $In_{0.97}Eu_{0.03}BO_3$ | 29 | |
| Example 9: | ZnS:Ag* | 26 | x = 0.276 |
| | $In_{0.9974}Eu_{0.0007}Tb_{0.0019}BO_3$ | 74 | y = 0.302 |
| Example 10: | ZnS:Ag* | 26 | x = 0.276 |
| | $In_{0.9974}Eu_{0.0007}Tb_{0.0019}BO_3$ | 59 | y = 0.302 |
| | $In_{0.9945}Eu_{0.0005}Tb_{0.005}BO_3$ | 11 | |
| | $In_{0.996}Eu_{0.0035}Tb_{0.0005}BO_3$ | 4 | |
| Comparative Example 1: | ZnS:Ag* | 45 | x = 0.276 |
| | (Zn,Cd)S:Cu | 55 | y = 0.302 |
| Comparative Example 2: | ZnS:Ag* | 17 | x = 0.276 |
| | $Zn_2SiO_4$:Mn,As | 30 | y = 0.302 |
| | $Zn_3(PO_4)_2$:Mn | 53 | |
| Comparative Example 3: | ZnS:Ag* | 19 | x = 0.276 |
| | $Zn_2SiO_4$:Mn,As | 19 | y = 0.302 |
| | $Cd_5Cl(PO_4)_3$:Mn | 62 | |
| Comparative Example 4: | ZnS:Ag* | 22 | x = 0.276 |
| | $Zn_2SiO_4$:Mn,As | 38 | y = 0.302 |
| | $In_{0.97}Eu_{0.03}BO_3$ | 40 | |
| Comparative Example 5: | ZnS:Ag* | 21 | x = 0.276 |
| | $In_{0.995}Tb_{0.005}BO_3$ | 39 | y = 0.302 |
| | $Zn(PO_4)_2$:Mn | 40 | |

TABLE 1a

| Example No. | Luminance (%) | Critical fusion frequency | Harmfulness | Color irregularity | Color uniformity (Center/corner chromaticity difference) |
|---|---|---|---|---|---|
| 1 | 75 | 56 | none | none | 0.005 |
| 2 | 74 | 56 | none | none | 0.005 |
| 3 | 75 | 56 | none | none | 0.005 |
| 4 | 75 | 56 | none | none | 0.005 |
| 5 | 72 | 56 | none | none | 0.005 |
| 6 | 69 | 56 | none | none | 0.005 |
| 7 | 74 | 56 | none | none | 0.005 |
| 8 | 76 | 56 | none | none | 0.005 |
| 9 | 73 | 56 | none | none | 0.005 |
| 10 | 73 | 56 | none | none | 0.005 |
| Comparative Example: | | | | | |
| 1 | 103 | 58 | do | none | 0.005 |
| 2 | 50 | 53 | none | do | 0.007 |
| 3 | 77 | 53 | do | do | 0.01 |
| 4 | 64 | 54 | none | do | 0.007 |
| 5 | 60 | 55 | none | do | 0.007 |

As can be seen from the foregoing, the mixed phosphor of this invention has sufficiently great luminance and also low in critical fusion frequency, thus indicating flicker alleviating effect is, harmless due to the absence of cadmium, and is also excellent in homogeneity during mixing because of the use of the same or the same kind of a phosphor matrix for formation of yellow which is complementary to blue. As a result, irregularity of the emitted color on the fluorescent screen can be reduced, and its commercial value is great.

We claim:

1. A white emitting luminescent phosphor for use in a cathode ray tube, which consists essentially of a mixture of from about 10 to 40 wt.% of a blue luminescent phosphor having the composition of ZnS:Ag, and having a 10% afterglow period of at least 10 microseconds, and at least one phosphor having a composition of the following formula:

$$In_{1-p-q-r}M_pEu_qTb_rBO_3$$

wherein M represents at least one element selected from the group consisting of Sc, Lu, Y, La, Gd and Ga; and each of p, q, and r represents a number satisfying the relationships of $p \geq 0$, $q \geq 0$, $r \geq 0$ and $0 < p+q+r < 1$, and having a 10% afterglow period of 10 milliseconds or longer.

2. The phosphor according to claim 1, wherein said numbers represented by p, q and r are $0.2 \geq p \geq 0$, $0.04 \geq q \geq 0$, and $0.04 \geq r \geq 0$, repsectively.

3. The phosphor according to claim 1, wherein said ZnS:Ag phosphor is mixed in an amount ranging from 10 to 30 wt.%.

4. The phosphor according to claim 1, wherein said white emitting luminescent phosphor has the following composition:

| ZnS:Ag | 25 wt. % |
|---|---|
| $In_{0.995}Tb_{0.005}BO_3$ | 47.5 wt. % |
| $In_{0.97}Eu_{0.03}BO_3$ | 27.5 wt. %. |

5. The phosphor according to claim 1, wherein said white emitting luminescent phosphor has the following composition:

| ZnS:Ag | 20 wt. % |
|---|---|
| $In_{0.995}Tb_{0.005}BO_3$ | 42 wt. % |
| $In_{0.996}Eu_{0.003}Tb_{0.001}BO_3$ | 38 wt. %. |

6. The phosphor according to claim 1, wherein said white emitting luminescent phosphor has the following composition:

| ZnS:Ag | 25 wt. % |
|---|---|
| $In_{0.995}Tb_{0.005}BO_3$ | 47.5 wt. % |
| $In_{0.76}Y_{0.2}Eu_{0.04}BO_3$ | 27.5 wt. %. |

7. The phosphor according to claim 1, wherein said white emitting luminescent phosphor has the following composition:

| ZnS:Ag | 25 wt. % |
|---|---|
| $In_{0.995}Tb_{0.005}BO_3$ | 47.5 wt. % |
| $In_{0.86}Sc_{0.1}Eu_{0.04}BO_3$ | 27.5 wt. %. |

8. The phosphor according to claim 1, wherein said white emitting luminescent phosphor has the following composition:

| ZnS:Ag | 26 wt. % |
|---|---|
| $In_{0.995}Tb_{0.005}BO_3$ | 43 wt. % |
| $In_{0.92}Lu_{0.05}Eu_{0.03}BO_3$ | 31 wt. %. |

9. The phosphor according to claim 1, wherein said white emitting luminescent phosphor has the following composition:

| ZnS:Ag | 25 wt. % |
|---|---|
| $In_{0.945}La_{0.05}Tb_{0.005}BO_3$ | 49 wt. % |
| $In_{0.97}Eu_{0.03}BO_3$ | 26 wt. %. |

10. The phosphor according to claim 1, wherein said white emitting luminescent phosphor has the following composition:

| ZnS:Ag | 26 wt. % |
|---|---|
| $In_{0.995}Tb_{0.005}BO_3$ | 45 wt. % |
| $In_{0.96}Gd_{0.01}Eu_{0.03}BO_3$ | 29 wt. %. |

11. The phosphor according to claim 1, wherein said white emitting luminescent phosphor has the following composition:

| ZnS:Ag | 27 wt. % |
|---|---|
| $In_{0.985}Ga_{0.01}Tb_{0.005}BO_3$ | 44 wt. % |
| $In_{0.97}Eu_{0.03}BO_3$ | 29 wt. %. |

12. The phosphor according to claim 1, wherein said white emitting luminescent phosphor has the following composition:

| ZnS:Ag | 26 wt. % |
|---|---|
| $In_{0.9974}Eu_{0.0007}Tb_{0.0019}BO_3$ | 74 wt. %. |

13. The phosphor according to claim 1, wherein said white emitting luminescent phosphor has the following composition:

| ZnS:Ag | 26 wt. % |
|---|---|
| $In_{0.9974}Eu_{0.0007}Tb_{0.0019}BO_3$ | 59 wt. % |
| $In_{0.9945}Eu_{0.0005}Tb_{0.005}BO_3$ | 11 wt. % |
| $In_{0.996}Eu_{0.0035}Tb_{0.0005}BO_3$ | 4 wt. %. |

* * * * *